United States Patent
Parrish

(10) Patent No.: US 6,830,028 B1
(45) Date of Patent: Dec. 14, 2004

(54) METHOD AND APPARATUS FOR REGULATING GAS ENTRAINMENT IN A FUEL INJECTION SPRAY OF AN INTERNAL COMBUSTION ENGINE

(75) Inventor: Scott E. Parrish, Kenosha, WI (US)

(73) Assignee: Bombardier Recreational Products Inc., Valcourt (CA)

( * ) Notice: Subject to any disclaimer, the term of this patent is extended or adjusted under 35 U.S.C. 154(b) by 352 days.

(21) Appl. No.: 09/594,310

(22) Filed: Jun. 15, 2000

(51) Int. Cl.[7] .............................. F02B 5/00; F02B 17/00
(52) U.S. Cl. ........................................ 123/305; 123/295
(58) Field of Search ................................ 123/295, 305, 123/257, 294, 73 C, 400, 509

(56) References Cited

U.S. PATENT DOCUMENTS

| | | | | |
|---|---|---|---|---|
| 3,963,001 A | * | 6/1976 | Kruckenberg et al. | 123/32 D |
| 4,301,655 A | * | 11/1981 | Thomas | 60/712 |
| 4,719,880 A | * | 1/1988 | Schlunke et al. | 123/65 |
| 5,694,898 A | * | 12/1997 | Pontoppidan et al. | 123/470 |
| 5,699,766 A | * | 12/1997 | Saito | 123/257 |
| 5,806,496 A | * | 9/1998 | Saito | 123/478 |
| 6,158,409 A | * | 12/2000 | Gillespie et al. | 123/193.6 |
| 6,295,969 B1 | * | 10/2001 | Kato et al. | 123/470 |

FOREIGN PATENT DOCUMENTS

JP 11-182247 * 7/1999

* cited by examiner

Primary Examiner—Mahmoud Gimie
(74) Attorney, Agent, or Firm—BRP Legal Services

(57) ABSTRACT

A technique is provided for regulating gas entrainment into a fuel spray in a fuel-injected engine. The fuel spray issues from a nozzle positioned in a gas entrainment shrouding recess, such as in the cylinder head. The depth and elevational profile of the recess are selected to provide a desired degree of gas entrainment. By reducing gas entrainment, a desired spray shape may be established or maintained, such as a hollow cone. More gas entrainment may be provided by altering the recess geometry, and that of the combustion chamber surrounding the recess, to modify the spray or the spray distribution, such as to partially or fully fill a spray cone.

24 Claims, 5 Drawing Sheets

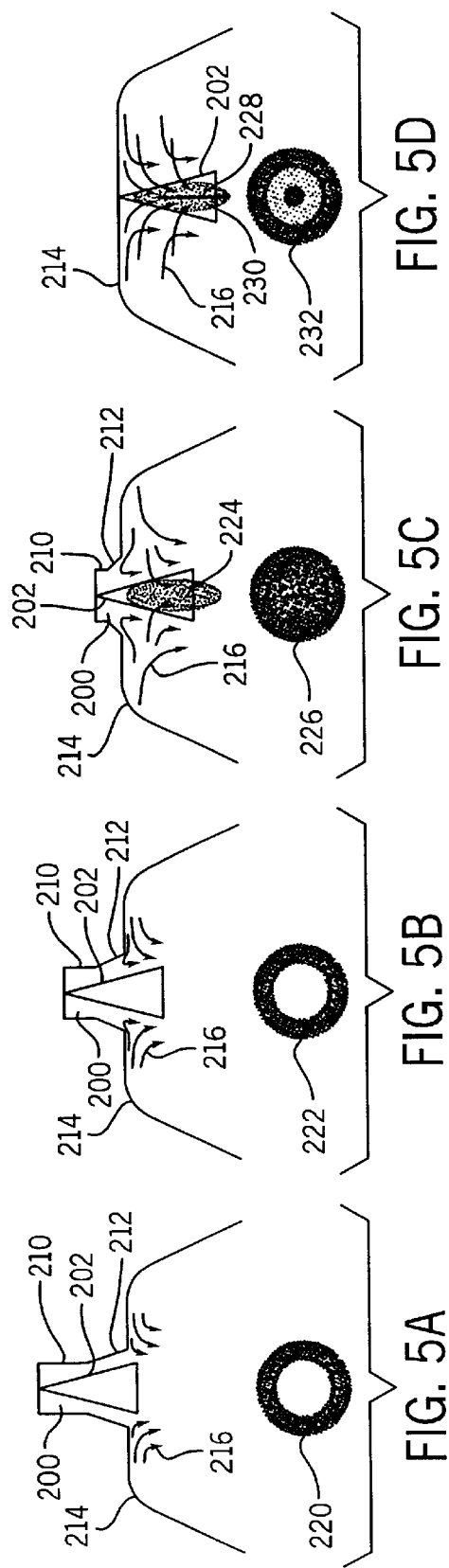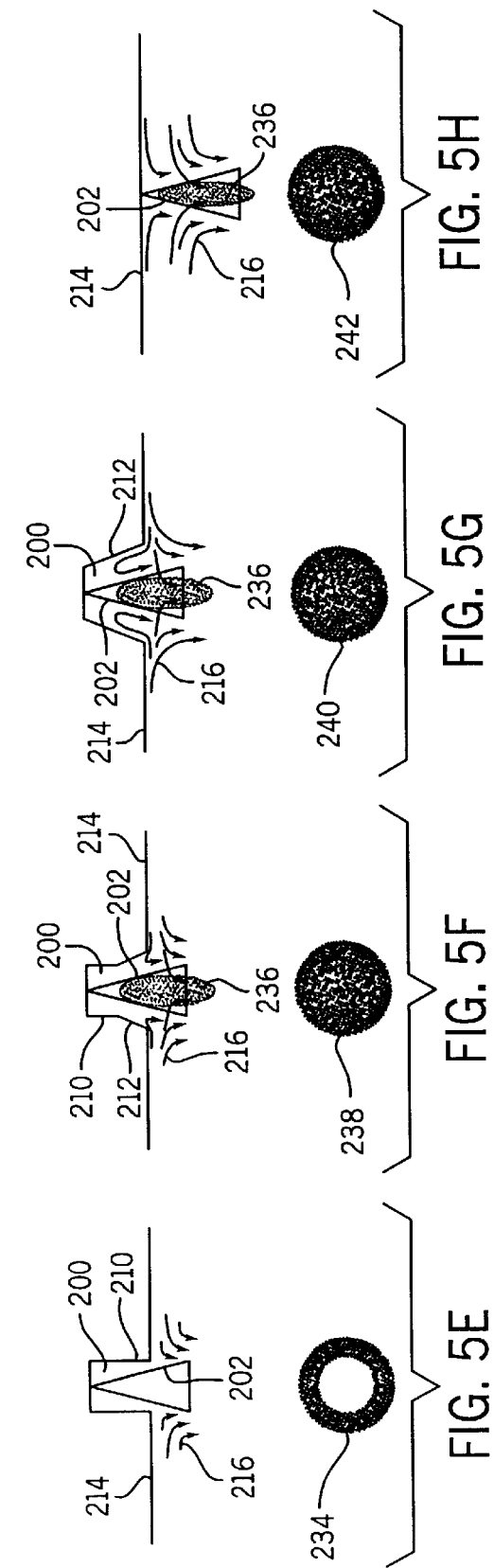

METHOD AND APPARATUS FOR REGULATING GAS ENTRAINMENT IN A FUEL INJECTION SPRAY OF AN INTERNAL COMBUSTION ENGINE

BACKGROUND OF THE INVENTION

1. Field of the Invention

The present invention relates generally to the field of internal combustion engine injection systems. More particularly, the invention relates to a technique for controlling gas entrainment in a fuel spray stream of a direct, in-cylinder injection system so as to improve runability and engine performance.

2. Description of the Related Art

Various systems have been developed for providing fuel delivery to internal combustion engines. In gasoline engines, for example, conventional approaches include carbureted fuel delivery, and fuel injection. Among fuel injection systems, a range of solutions are provided by existing technologies, including electronic fuel injection in which fuel delivery is controlled by electronic circuitry. Such systems provide for excellent control of fuel delivery across a range of operating conditions, particularly desired torque and speed ranges. In general, a fuel is injected either directly into a combustion chamber, or at an inlet side of the combustion chamber in a moving air stream. While such techniques are useful in both two-stroke and four-stroke engines, they have become increasingly popular in two-stroke engines due to the greatly improved emissions controls affordable through direct, in-cylinder injection.

In one known type of in-cylinder injection, a liquid fuel is dispersed within a cylinder under the influence of a pressure impulse developed by a linear electric motor and pump. By appropriately controlling the timing and waveform of driving signals applied to the motor, various volumes and rates of fuel delivery can be obtained. Other in-cylinder injection systems employ a mixture of air and fuel. These systems may also employ electrically-driven pumps for delivery of the mixture. Furthermore, injection systems are known in which a pressurized fuel supply, typically delivered in a fuel rail, is coupled to delivery mechanisms such as solenoid-operated valves. The valves may be opened and closed to allow for flow of the pressurized fuel into the combustion chambers.

In each of the various types of in-cylinder fuel injection, sprays of fuel are developed that both distribute the fuel and air, enhance mixing of the fuel and air, and finely atomize the fuel for improved combustion. While the nature of the fuel spray may be altered by such factors as impingement on a piston surface or deflection from various moving and static surfaces, the maintenance of the desired shape and distribution of the fuel spray is often extremely important in maintaining a good fuel distribution and combustion. When operating parameters and mechanical tolerances alter the timing or distribution of the spray within the combustion chamber, significant changes in engine performance may be observed. The degradation of engine performance, which, in certain cases may even pose issues of runability of the engine, may occur both as a result of the basic engine and component design, as well as due to factors which may change during the life of the machine.

There is a need, at present, for an improved technique for internal combustion engine design, particularly in the area of direct, in-cylinder fuel injected engine design. Within this field, there is need for an approach to component design and layout which enhances combustion and runability of an engine by careful control of distribution and maintenance of a fuel spray delivered by direct, in-cylinder injection nozzle.

SUMMARY OF THE INVENTION

The present technique offers a design for internal combustion engines which contemplates such needs. The technique is applicable to a variety of fuel injection systems, and is particularly well suited to pressure pulsed designs, in which fuel is pressurized for injection into a combustion chamber by a reciprocating electric motor and pump. However, other injection system types may benefit from the technique described herein, including those in which fuel and air are admitted into a combustion chamber in mixture.

The present technique provides a design for a combustion chamber which limits or controls gas entrainment into a fuel spray. In accordance with aspects of the technique, an injection nozzle is disposed within a recess of a combustion chamber, typically in the cylinder head. The recess houses the fuel injection nozzle, and permits a spray from the nozzle to be injected directly into the combustion chamber. The geometry and disposition of the recess are selected such that gas entrainment into the fuel spray is maintained at desired levels during operation. The recess may include straight, convergent, divergent, or similar sections, and may comprise several such sections along its length. Moreover, the geometry of areas of the combustion chambers adjacent to the recess may aid in controlling gas entrainment. The component structures thus allow the engine designer to permit relative levels of gas entrainment so as to affect the fuel spray in desired manners. For example, very little gas entrainment may be desired to maintain a desired spray profile, such as in a hollow cone. Other levels of gas entrainment may be selected to provide more mixing within the cone, or to provide solid or semi-solid spray cones.

BRIEF DESCRIPTION OF THE DRAWINGS

The foregoing and other advantages of the invention will become apparent upon reading the following detailed description and upon reference to the drawings in which:

FIG. 5A–5H is a series of exemplary recess and cylinder configurations employing the present technique for controlling gas entrainment and fuel spray profiles and distributions.

DETAILED DESCRIPTION OF SPECIFIC EMBODIMENTS

Figure 1:
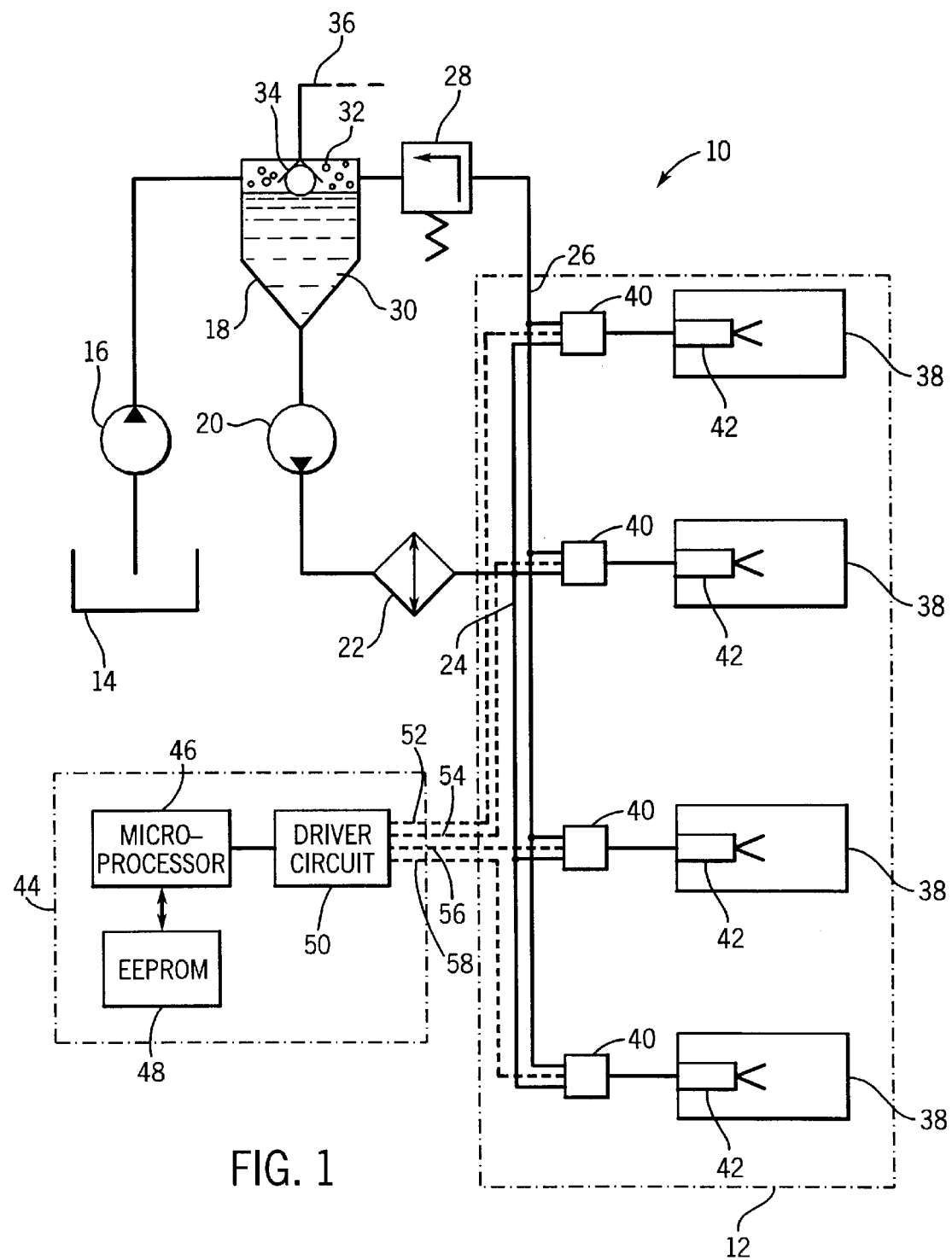
FIG. 1 is a diagrammatical representation of an internal combustion engine, such as an engine of an outboard marine motor.

Turning now to the drawings, and referring first to FIG. 1, the present technique permits the control of gas entrainment into a fuel spray of an internal combustion engine, represented diagrammatically in FIG. 1. By way of example, in FIG. 1 a fuel injection system 10 is illustrated as including a series of pumps for displacing fuel under pressure in an internal combustion engine 12. While the fluid pumps of the present technique may be employed in a wide variety of settings, they are particularly well suited to fuel injection systems in which relatively small quantities of fuel are pressurized cyclically to inject the fuel into combustion chambers of an engine as a function of the engine demands. The pumps may be employed with individual combustion chambers as in the illustrated embodiment, or may be associated in various ways to pressurize quantities of fuel, as in a fuel rail, feed manifold, and so forth. Even more generally, the pumping technique may be employed in settings other than fuel injection, such as for displacing fluids under pressure in response to electrical control signals used to energize coils of a drive assembly, as described below. Moreover, the system 10 and engine 12 may be used in any appropriate setting, and are particularly well suited to two-stroke applications such as marine propulsion, outboard motors, motorcycles, scooters, snowmobiles and other vehicles.

In the embodiment shown in FIG. 1, the fuel injection system 10 includes a fuel reservoir 14, such as a tank for containing a reserve of liquid fuel. A first pump 16 draws the fuel from the reservoir, and delivers the fuel to a separator 18. While the system may function adequately without a separator 18, in the illustrated embodiment, separator 18 serves to insure that the fuel injection system downstream receives liquid fuel, as opposed to mixed phase fuel. A second pump 20 draws the liquid fuel from separator 18 and delivers the fuel, through a cooler 22, to a feed or inlet manifold 24. Cooler 22 may be any suitable type of fluid cooler, including both air and liquid heater exchangers, radiators, and so forth.

Fuel from the feed manifold 24 is available for injection into combustion chambers of the engine 12, as described more fully below. A return manifold 26 is provided for recirculating fluid not injected into the combustion chambers of the engine. In the illustrated embodiment a pressure regulating valve 28 is placed in series in the return manifold line 26 for maintaining a desired pressure within the return manifold. Fluid returned via the pressure regulating valve 28 is recirculated into the separator 18 where the fuel collects in liquid phase as illustrated at reference numeral 30. Gaseous phase components of the fuel, designated by referenced numeral 32 in FIG. 1, may rise from the fuel surface and, depending upon the level of liquid fuel within the separator, may be allowed to escape via a float valve 34. A vent 36 is provided for permitting the escape of gaseous components, such as for repressurization, recirculation, and so forth.

The engine 12 includes a series of combustion chambers or cylinders 38 for driving an output shaft (not shown) in rotation. As will be appreciated by those skilled in the art, depending upon the engine design, pistons (not shown in FIG. 1) are driven in a reciprocating fashion within each combustion chamber in response to ignition of fuel within the combustion chamber. In two-stroke applications, the stroke of the piston within the chamber will permit fresh air for subsequent combustion cycles to be admitted into the chamber, while scavenging combustion products from the chamber. While in a present embodiment engine 12 employs a straightforward two-stroke engine design, the present technique may be adapted for a wide variety of applications and engine designs, including other than two-stroke engines and cycles.

In the illustrated embodiment, a reciprocating pump 40 is associated with each combustion chamber, drawing pressurized fuel from the feed manifold 24, and further pressurizing the fuel for injection into the respective combustion chamber. A nozzle 42 is provided for atomizing the pressurized fuel downstream of each reciprocating pump 40. While the present technique is not intended to be limited to any particular injection system or injection scheme, in the illustrated embodiment a pressure pulse created in the liquid fuel forces a fuel spray to be formed at the mouth or outlet of the nozzle, for direct, in-cylinder injection. The pumps 40 are activated by energizing drive signals which cause their reciprocation in any one of a wide variety of manners as described more fully below.

The operation of reciprocating pumps 40 is controlled by an electronic control unit (ECU) 44. The ECU 44, will typically include a programmed microprocessor 46 or other digital processing circuitry, a memory device such as EEPROM 48 for storing a routine employed in providing command signals from the microprocessor 46, and a driver circuit 50 for processing commands or signals from the microprocessor 46. The driver circuit 50 is constructed with multiple circuits or channels. Each individual channel corresponds with a reciprocating pump 40. A command signal is passed from the microprocessor 46 to the driver circuit 50. The driver circuit 50, in response to the command signal, generates separate drive signals for each channel. These signals are carried to each individual pump 40 as represented by individual electric connections 52, 54, 56, and 58. Each of these connections corresponds with a channel of the driver circuit 50.

Figure 2:
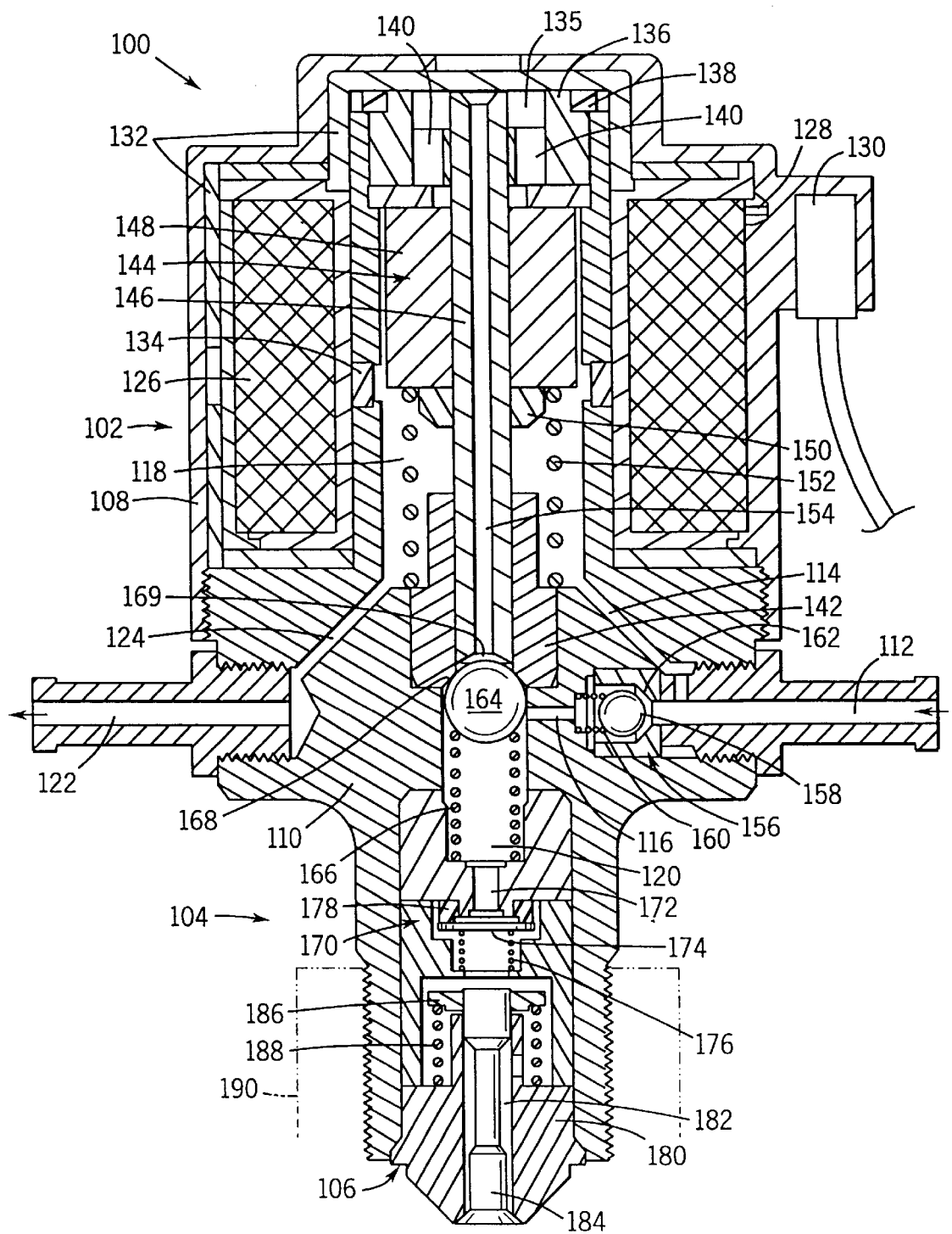
FIG. 2 is partially-sectioned elevational view of an exemplary fuel delivery apparatus including a reciprocating electric motor and a pump for delivery fuel to an injection nozzle.
Figure 3:
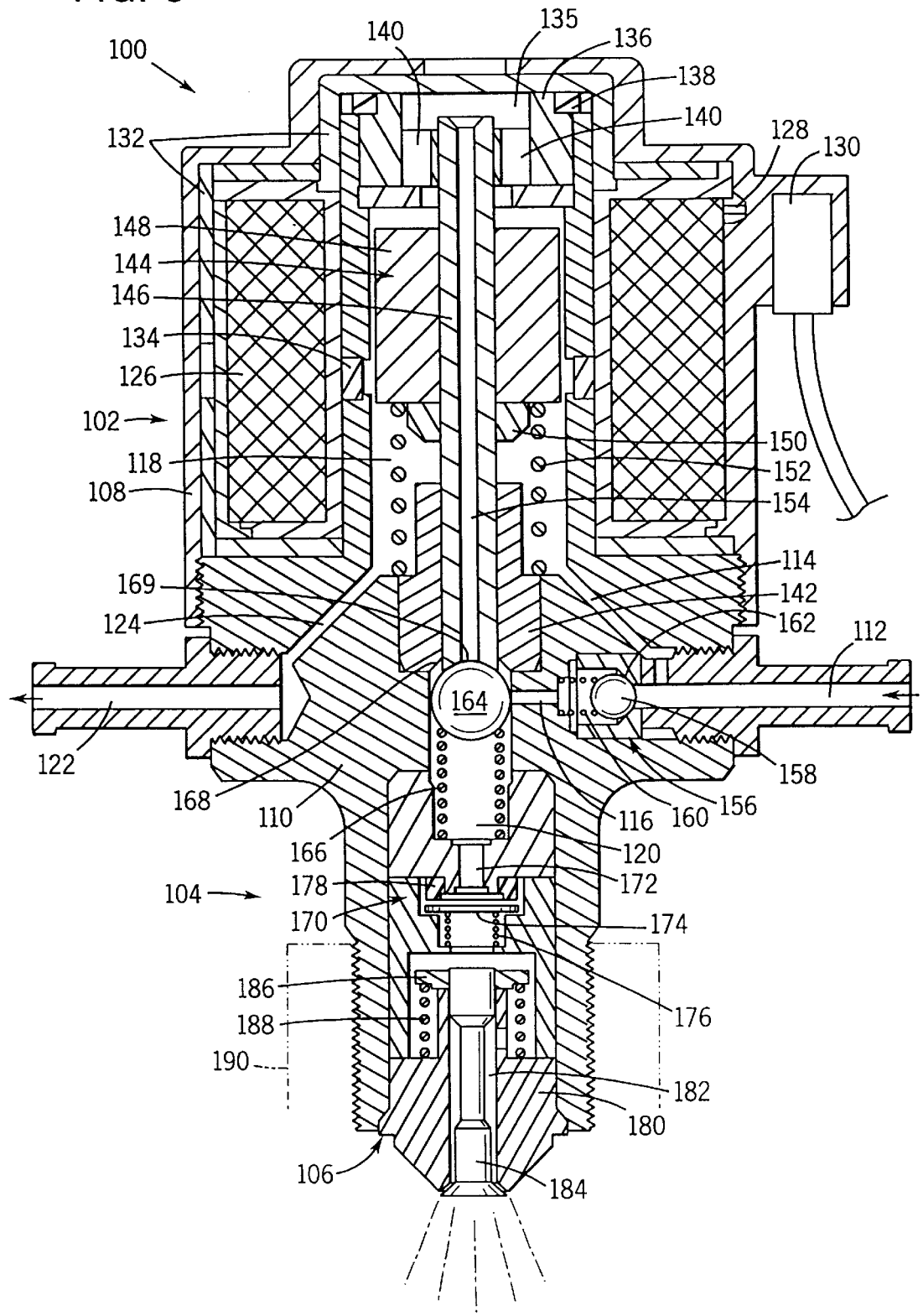
FIG. 3 is an elevational view of the device shown in FIG. 2 after actuation for delivery for fuel spray into an engine combustion chamber.

Turning now to FIGS. 2 and 3, an exemplary reciprocating pump assembly, such as for use in a fuel injection system of the type illustrated in FIG. 1, is shown. Specifically, FIG. 2 illustrates the internal components of a pump assembly including a drive section and a pumping section in a first position wherein fuel is introduced into the pump for pressurization. FIG. 3 illustrates the same pump following energization of a solenoid coil to drive a reciprocating assembly and thus cause pressurization of the fuel and its expulsion from the pump. It should be borne in mind that the particular configurations illustrated in FIGS. 2 and 3 are intended to be exemplary only. Other variations on the pump may be envisaged, particularly variants on the components used to pressurize the fluid and to deliver the fluid to a downstream application.

Referring to FIG. 2, an embodiment is shown wherein the fluid actuators and fuel injectors are combined into a single unit, or pump-nozzle assembly 100. The pump-nozzle assembly 100 is composed of three primary subassemblies: a drive section 102, a pump section 104, and a nozzle 106. The drive section 102 is contained within a solenoid housing 108. A pump housing 110 serves as the base for the pump-nozzle assembly 100. The pump housing 110 is attached to the solenoid housing 108 at one end and to the nozzle 106 at an opposite end.

There are several flow paths for fuel within pump-nozzle assembly 100. Initially, fuel enters the pump-nozzle assembly 100 through the fuel inlet 112. Fuel can flow from the fuel inlet 112 through two flow passages, a first passageway 114 and a second passageway 116. A portion of fuel flows through the first passageway 114 into an armature chamber 118. For pumping, fuel also flows through the second passageway 116 to a pump chamber 120. Heat and vapor bubbles are carried from the armature chamber 118 by fuel flowing to an outlet 122 through a third fluid passageway 124. Fuel then flows from the outlet 122 to the common return line 26 (see FIG. 1).

The drive section 102 incorporates a linear electric motor. In the illustrated embodiment, the linear electric motor is a reluctance gap device. In the present context, reluctance is the opposition of a magnetic circuit to the establishment or flow of a magnetic flux. A magnetic field and circuit are produced in the motor by electric current flowing through a coil 126. The coil 126 receives power from the injection controller 44 (see FIG. 1). The coil 126 is electrically coupled by leads 128 to a receptacle 130. The receptacle 130 is coupled by conductors (not shown) to the ECU 44. Magnetic flux flows in a magnetic circuit 132 around the exterior of the coil 126 when the coil is energized. The magnetic circuit 132 is composed of a material with a low reluctance, typically a magnetic material, such as ferromagnetic alloy, or other magnetically conductive materials. A gap in the magnetic circuit 132 is formed by a reluctance gap spacer 134 composed of a material with a relatively higher reluctance than the magnetic circuit 132, such as synthetic plastic.

A reciprocating assembly 144 forms the linear moving elements of the reluctance motor. The reciprocating assembly 144 includes a guide tube 146, an armature 148, a centering element 150 and a spring 152. The guide tube 146 is supported at the upper end of travel by the upper bushing 136 and at the lower end of travel by the lower bushing 142. An armature 148 is attached to the guide tube 146. The armature 148 sits atop a biasing spring 152 that opposes the downward motion of the armature 148 and guide tube 146, and maintains the guide tube and armature in an upwardly biased or retracted position. Centering element 150 keeps the spring 152 and armature 148 in proper centered alignment. The guide tube 146 has a central passageway 154 which permits the flow of a small volume of fuel when the guide tube 146 moves a given distance through the armature chamber 118 as described below. Flow of fuel through the guide tube 146 permits its acceleration in response to energization of the coil during operation.

When the coil 126 is energized, the magnetic flux field produced by the coil 126 seeks the path of least reluctance. The armature 148 and the magnetic circuit 132 are composed of a material of relatively low reluctance. The magnetic flux lines will thus extend around coil 126 and through magnetic circuit 132 until the magnetic gap spacer 134 is reached. The magnetic flux lines will then extend to armature 148 and an electromagnetic force will be produced to drive the armature 148 downward towards alignment with the reluctance gap spacer 134. When the flow of electric current is removed from the coil by the injection controller 44, the magnetic flux will collapse and the force of spring 152 will drive the armature 148 upwardly and away from alignment with the reluctance gap spacer 134. Cycling the electrical control signals provided to the coil 126 produces a reciprocating linear motion of the armature 148 and guide tube 146 by the upward force of the spring 152 and the downward force produced by the magnetic flux field on the armature 148.

During the return motion of the reciprocating assembly 144 a fluid brake within the pump-nozzle assembly 100 acts to slow the upward motion of the moving portions of the drive section 102. The upper portion of the solenoid housing 108 is shaped to form a recessed cavity 135. An upper bushing 136 separates the recessed cavity 135 from the armature chamber 118 and provides support for the moving elements of the drive section at the upper end of travel. A seal 138 is located between the upper bushing 136 and the solenoid housing 108 to ensure that the only flow of fuel from the armature chamber 118 to and from the recessed cavity 135 is through fluid passages 140 in the upper bushing 136. In operation, the moving portions of the drive section 102 will displace fuel from the armature chamber 118 into the recessed cavity 135 during the period of upward motion. The flow of fuel is restricted through the fluid passageways 140, thus, acting as a brake on upward motion. A lower bushing 142 is included to provide support for the moving elements of the drive section at the lower travel limit and to seal the pump section from the drive section.

While the first fuel flow path 114 provides proper dampening for the reciprocating assembly as well as providing heat transfer benefits, the second fuel flow path 116 provides most of the fuel for pumping and, ultimately, for combustion. The drive section 102 provides the motive force to drive the pump section 104 which produces a surge of pressure that forces fuel through the nozzle 106. As described above, the drive section 102 operates cyclically to produce a reciprocating linear motion in the guide tube 146. During a charging phase of the cycle, fuel is drawn into the pump section 104. Subsequently, during a discharging phase of the cycle, the pump section 104 pressurizes the fuel and discharges the fuel through the nozzle 106, such as directly into a combustion chamber 38 (see FIG. 1). Also as described below, the fuel spray is at least partially shrouded from entrainment of gas from the combustion chamber so as to maintain the desired shape and distribution of the spray.

During the charging phase fuel enters the pump section 104 from the inlet 112 through an inlet check valve assembly 156. The inlet check valve assembly 156 contains a ball 158 biased by a spring 160 toward a seat 162. During the charging phase the pressure of the fuel in the fuel inlet 112 will overcome the spring force and unseat the ball 158. Fuel will flow around the ball 158 and through the second passageway 116 into the pump chamber 120. During the discharging phase the pressurized fuel in the pump chamber 120 will assist the spring 160 in seating the ball 158, preventing any reverse flow through the inlet check valve assembly 156.

A pressure surge is produced in the pump section 104 when the guide tube 146 drives a pump sealing member 164 into the pump chamber 120. The pump sealing member 164 is held in a biased position by a spring 166 against a stop 168. The force of the spring 166 opposes the motion of the pump sealing member 164 into the pump chamber 120. When the coil 126 is energized to drive the armature 148 towards alignment with the reluctance gap spacer 134, the guide tube 146 is driven towards the pump sealing member 164. There is, initially, a gap 169 between the guide tube 146 and the pump sealing member 164. Until the guide tube 146 transits the gap 169 there is essentially no increase in the fuel pressure within the pump chamber 120, and the guide tube and armature are free to gain momentum by flow of fuel through passageway 154. The acceleration of the guide tube 146 as it transits the gap 169 produces the rapid initial surge in fuel pressure once the guide tube 146 contacts the pump sealing member 164, which seals passageway 154 to pressurize the volume of fuel within the pump chamber 120.

Referring generally to FIG. 3, a seal is formed between the guide tube 146 and the pump sealing member 164 when the guide tube 146 contacts the pump sealing member 164. This seal closes the opening to the central passageway 154 from the pump chamber 120. The electromagnetic force driving the armature 148 and guide tube 146 overcomes the force of springs 152 and 166, and drives the pump sealing member 164 into the pump chamber 120. This extension of the guide tube into the pump chamber 120 causes an increase in fuel pressure in the pump chamber 120 that, in turn, causes the inlet check valve assembly 156 to seat, thus stopping the flow of fuel into the pump chamber 120 and ending the charging phase. The volume of the pump chamber 120 will decrease as the guide tube 146 is driven into the pump chamber 120, further increasing pressure within the pump chamber 120 and forcing displacement of the fuel from the pump chamber 120 to the nozzle 106 through an outlet check valve assembly 170. The fuel displacement will continue as the guide tube 146 is progressively driven into the pump chamber 120.

Pressurized fuel flows from the pump chamber 120 through a passageway 172 to the outlet check valve assembly 170. The outlet check valve assembly 170 includes a valve disc 174, a spring 176 and a seat 178. The spring 176 provides a force to seat the valve disc 174 against the seat 178. Fuel flows through the outlet check valve assembly 170 when the force on the pump chamber side of the valve disc 174 produced by the rise in pressure within the pump chamber 120 is greater than the force placed on the outlet side of the valve disc 174 by the spring 176 and any residual pressure within the nozzle 106.

Once the pressure in the pump chamber 120 has risen sufficiently to open the outlet check valve assembly 170, fuel will flow from the pump chamber 120 to the nozzle 106. The nozzle 106 is comprised of a nozzle housing 180, a passage 182, a poppet 184, a retainer 186, and a spring 188. The poppet 184 is disposed within the passage 182. The retainer 186 is attached to the poppet 184, and spring 188 applies an upward force on the retainer 186 that acts to hold the poppet 184 seated against the nozzle housing 180. A volume of fuel is retained within the nozzle 106 when the poppet 184 is seated. The pressurized fuel flowing into the nozzle 106 from the outlet check valve assembly 170 pressurizes this retained volume of fuel. The increase in fuel pressure applies a force that unseats the poppet 184. Fuel flows through the opening created between the nozzle housing 180 and the poppet 184 when the poppet 184 is unseated. The inverted cone shape of the poppet 184 atomizes the fuel flowing from the nozzle 106 in the form of a spray. The pump-nozzle assembly 100 is preferably threaded or flanged to allow the pump-nozzle assembly to be screwed into a cylinder head 190 (See FIG. 4). Thus, the fuel spray from the nozzle 106 may be injected directly into a cylinder.

When the drive signal or current applied to the coil 126 is removed, the drive section 102 will no longer drive the armature 148 towards alignment with the reluctance gap spacer 134, ending the discharging phase and beginning a subsequent charging phase. The spring 152 will reverse the direction of motion of the armature 148 and guide tube 146 away from the reluctance gap spacer 134. Retraction of the guide tube from the pump chamber 120 causes a drop in the pressure within the pump chamber 120, allowing the outlet check valve assembly 170 to seat. The poppet 184 similarly retracts and seats, and the spray of fuel into the cylinder is interrupted. Following additional retraction of the guide tube, the inlet check valve assembly 156 will unseat and fuel will flow into the pump chamber 120 from the inlet 112. Thus, the operating cycle the pump-nozzle assembly 100 returns to the condition shown in FIG. 2.

While the foregoing structure and operation for injecting a fuel spray into the engine combustion chambers has been presented as a present exemplary embodiment, it should be noted that various alternative arrangements can be utilized in connection with the present technique. Specifically, alternative devices may be envisaged for creating a pulse within a controlled volume of liquid fuel. By way of example, electrically-driven linear motors may employ permanent magnet arrangements in connection with energized coils to produce a pulsed fuel spray. Moreover, devices other than linear electric motors and pumps may be employed, such as fuel rails connected to solenoid valves energizable to allow pressurized fuel to be injected through a nozzle arrangement. Also, other fuel injection techniques may be employed with aspects of the present gas entrainment regulation approaches, including techniques in which fuel and air mixtures are formed prior to injection into a combustion chamber.

To enhance the control of the fuel spray into a combustion chamber, the present technique allows for control of gas entrained by and into a fuel spray from surfaces and volumes surrounding the spray during operation. The velocity and movement of a fuel spray in a combustion chamber results in uptake and entrainment of gas from the surrounding volume of air within the combustion chamber. Under certain conditions, this entrainment of gas can alter the shape of the fuel spray, degrading engine performance and even posing issues of runability of the engine. By the present technique, the entrainment of gas into the injected fuel spray is regulated by geometries and flow control surfaces in the vicinity of the fuel spray.

Figure 4:
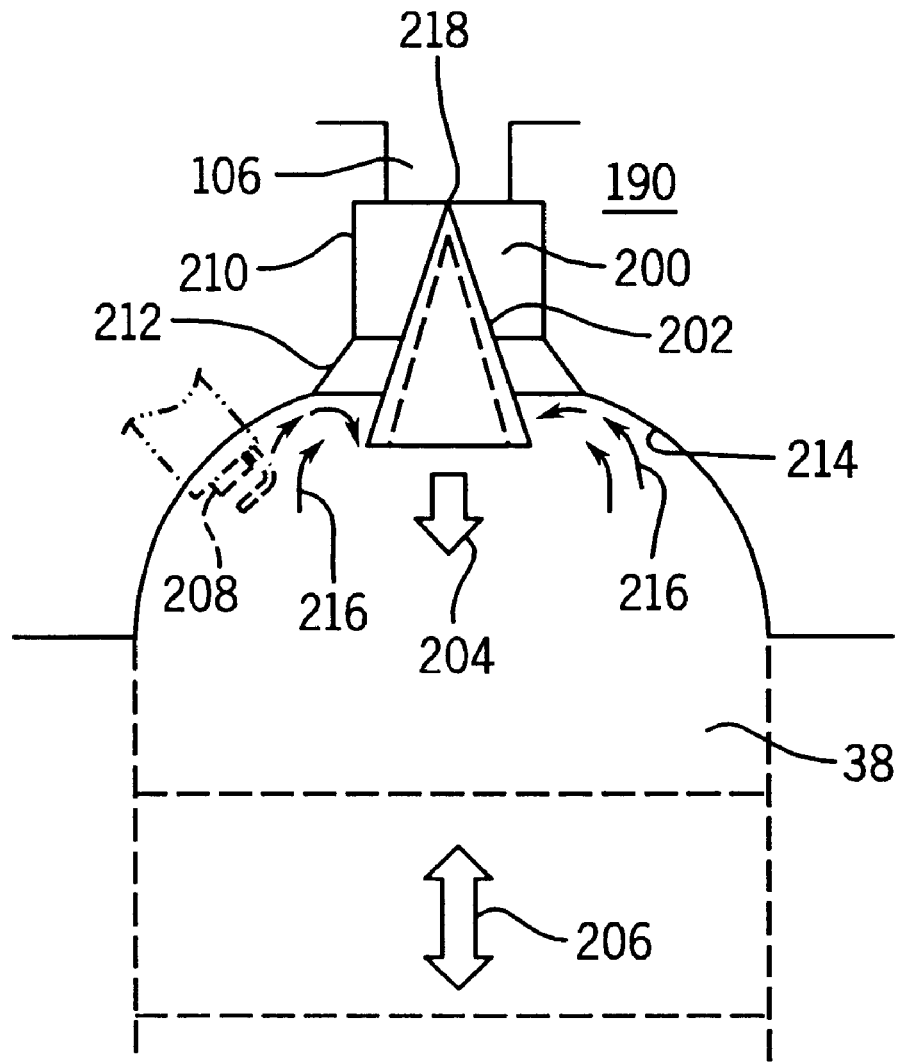
FIG. 4 is a more detailed elevational view of a fuel injection spray from a nozzle disposed within a cylinder head in accordance with aspects of the present technique.

FIG. 4 illustrates a simplified arrangement of a cylinder head in which a fuel spray is introduced by a nozzle and pump arrangement as described above. As noted above, the cylinder or combustion chamber 38 is formed with a cylinder head 190, a nozzle 106 being positioned within the cylinder head for injecting fuel directly into the combustion chamber. A shrouding recess 200 is formed in the combustion chamber, preferably in the cylinder head, for controlling the entrainment of gases into the fuel spray during operation. As shown in FIG. 4, a fuel spray 202 is injected through the recess 200, typically in a form of a hollow cone. As the fuel spray cone advances toward the combustion chamber, as indicated by arrow 204, gas is entrained into the fuel spray, but is controlled or regulated as summarized below. During operation of the engine, a piston is disposed within the combustion chamber as indicated at reference numeral 206, compressing gases and fuel in a manner generally known in the art. An ignition device may be provided in the combustion chamber, such as a spark plug 208, which serves to ignite the fuel and air mixture. As will be appreciated by those skilled in the art, various alternative and cooperating geometries may be provided within the cylinder head, the cylinder walls, the piston surfaces, and so forth to deflect, mix, or otherwise diffuse gases and fuel within the combustion chamber during operation.

Various geometries are presently contemplated for the shrouding recess 200. In the embodiment illustrated in FIG. 4, for example, the recess consists of a generally right cylindrical section 210 immediately adjacent to the nozzle 106. A divergent section, generally in the form of frusto-conical surface 212 is contiguous the right cylinder surface 210, and diverges in a direction toward the combustion chamber 38. Divergent section 212 is contiguous with an upper peripheral surface 214 of the combustion chamber, with the latter surface serving to direct gases displaced by rapid advance of the fuel spray 202. Entrained or displaced gases, denoted generally by arrows 216 in the figures, are thus moved along surface 214 toward the fuel spray 202 as it advances in the combustion chamber. However, gas entrainment is largely controlled by the surfaces of recess 200, such that the integrity or distribution of the fuel spray cone (hollow, solid, or some combination) and the desired phase of the fuel is maintained at least to a location where the fuel spray enters the combustion chamber from the recess 200.

Various dimensions and configurations may be envisaged for the arrangement shown in FIG. 4. For example, in the illustrated embodiment, the right cylindrical section 210, which extends from an upper-most wall 218 where the injection nozzle is housed, may have a width of approximately 8.6 mm. The divergent section 212 opens at a cone angle of approximately 15 degrees (half angle). In the embodiment illustrated in FIG. 4, adequate control of gas entrainment for a spray having a cone angle of approximately 12 degrees (half angle) and a diameter at wall 218 (exiting the nozzle) of between 3.5 and 3.8 mm has been found to result from the illustrated elevational profile, with the two contiguous gas entrainment shrouding sections having a combined length of approximately 5.0 mm. A width of a peripheral portion 214 between rounded shoulders was approximately 20.0 mm.

Various alternative elevational profiles and dimensions may be provided, depending upon the desired fuel spray profile, the distribution of the spray within the profile, the initial fuel spray profile provided by the nozzle, the rate of advance of the fuel spray, the volume of fuel injected per cycle, and so forth. FIGS. 5A through 5H illustrate several such configurations and the resulting sectional distribution of the spray at a point displaced from the injection nozzle. It will be noted that, as discussed below, the gas entrainment into the fuel spray regulated by the present techniques may also be affected and controlled by a peripheral area of the combustion chamber surrounding or adjacent to the shrouding recess. Moreover, the phase (i.e., vapor or liquid) of the fuel can be regulated by appropriate control of gas entrainment as described below.

The embodiment illustrated in FIG. 5A presents a shrouding recess 200 formed of a straight cylindrical section 210 and a contiguous diverging section 212. The fuel spray is provided at a considerable depth within the recess, so as to provide a high degree of resistance to gas entrainment into the spray. In particular, it will be noted that the spray cone 202 approaches the location of inflection between surfaces 210 and 212 more in the embodiment of FIG. 5A than in the other embodiments described below. Accordingly, for a spray cone of dimensions similar to those described above, and for a total recess depth of approximately 7.0 mm, entrained gases, as represented by arrows 216, have a minimal affect on the distribution of the hollow cone, as indicated by reference numeral 220 in FIG. 5A. It should also be noted that gas entrainment is further reduced by the provision of sloping sidewalls in the adjacent peripheral region 214 or where desired, may be augmented by more planar or flush peripheral sidewalls, as described below.

The embodiment of FIG. 5B is generally similar to that of FIG. 5A in width of the sections 210 and 212, but is considerably less deep, conforming to the dimensions mentioned above with respect to FIG. 4. It has been found that with similar peripheral section 214, a hollow cone is maintained as indicated at peripheral numeral 222, but with relatively more entrained gases drawn by the advancing fuel spray cone. Moreover, although similar liquid phase spray distributions may occur in both cases, vapor phase distribution may be significantly affected.

FIGS. 5C and 5D illustrate a progressively more shallow gas entrainment shrouding (on the order of 2.5 mm total depth in FIG. 5C), recess and a control example in which no such recess is provided at all. In the embodiment of FIG. 5C, considerably more gas entrainment occurs as the fuel spray advances from the recess 200, with gas entrainment causing filling of the cone with entrained gases and fuel as indicated at reference numeral 224, to provide a substantially solid fuel cone 226. In the embodiment of FIG. 5D, gas entrainment is further increased as indicated by arrows 216, with no entrainment shrouding recess being provided. In the resulting spray, a central concentration of fuel 228 was observed, surrounded by a region of lower concentration 230. The resulting fuel spray 232 thus consisted of a modified solid/hollow cone.

FIGS. 5E through 5H represent additional variations of the gas entrainment control or shrouding recess, in conjunction with a substantially flat or planar cylinder head. It should be noted that for the present purposes, the actual configuration of the cylinder head need not be completely planar, but may be generally planar for a sufficient length to function as a planar analog for the purposes of the gas dynamics illustrated in the figures. As shown in FIG. 5E, the recess 200 has a generally cylindrically sidewall 200 which meets the upper peripheral wall 214 of the cylinder without a divergent section as shown in FIG. 5A. The depth of the recess of FIG. 5E is similar, however, to that of FIG. 5B. The resulting effect on gas entrainment into the fuel spray is similar to the effect of the recess of FIG. 5B, with a substantially hollow cone 234 being maintained, but with more gas entrainment than in the embodiment of FIG. 5A.

In the embodiment shown in FIG. 5F, recess 200 is formed of a substantially right cylindrical portion 210, followed by a divergent section 212. The configuration of the recess is substantially identical to that of FIG. 5B, but the recess is contiguous with a substantially planar upper surface 214 of the cylinder. It has been found that substantially more gas entrainment occurs in the fuel spray in the embodiment of FIG. 5F, with an internal region of fuel and air 236 developing so as to provide a substantially solid cone 238 of fuel. The relative degree of gas entrainment of the embodiment of FIG. 5F was substantially the same as that provided by the arrangement of FIG. 5C. A similar degree of gas entrainment was experienced from the recess configuration of FIG. 5G. In that embodiment, a sloping or divergent sidewall portion 212 was employed without a right cylindrical surface. As indicated by arrows 216 in FIG. 5G, gas entrainment is believed to occur between the spray cone 202 and the inner surface of the divergent section 212. A central region of fuel and air 236, similar to that shown in FIG. 5F, was observed with a substantially solid cone spray being provided as indicated at reference numeral 240. Finally, in the embodiment of FIG. 5H, a substantially planar wall section 214 was tested with no recess, and a substantially solid fuel spray included a central region 236 which was of slightly higher concentration than the surrounding region as indicated by reference numeral 242.

As can be seen from various embodiments illustrated in FIGS. 5A through 5H, gas entrainment may be regulated in accordance with the present technique by several factors. These factors include the relative elevational geometry of the gas entrainment shrouding recess 200, the depth of the recess, and the geometry of the combustion chamber wall surrounding or adjacent to the recess. It should also be noted that, while in a present embodiment a configuration such as that shown in FIG. 5C may be preferred, such as to maintain a generally homogeneous cone of fuel spray, in various applications other fuel sprays may be desired, including modified hollow cones, solid cones, and so forth, with each of these being provided by appropriate configuration of the shrouding recess and the surrounding surfaces.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method for regulating gas entrainment into a fuel spray of an internal combustion engine, the engine including a combustion chamber and a fuel injection nozzle disposed in fluid communication with the combustion chamber for direct injection of a combustible fuel, the method comprising the steps of:

providing a recess within a peripheral surface of the combustion chamber, and disposing the nozzle within the recess to inject a conical fuel spray into the combustion chamber through the recess;

wherein the recess has a depth and elevational profile selected to limit gas entrainment from a volume including the combustion chamber into the fuel spray;

the elevational profile includes at least two different regions, a first region generally defines a right cylindrical section and a second region defines a diverging section.

2. The method of claim 1, wherein the recess is provided in a head region of the combustion chamber.

3. The method of claim 1, wherein the second region is disposed proximate the combustion chamber with respect to the first region.

4. The method of claim 3, wherein the second region diverges in a direction toward the combustion chamber.

5. The method of claim 1, comprising the further step of providing a profiled peripheral region of the combustion chamber adjacent to the recess to regulate flow of gas towards the fuel spray during operation.

6. The method of claim 5, wherein the peripheral region has a generally dome-shaped profile.

7. The method of claim 1, wherein the depth and elevational profile of the recess are selected to provide a substantially hollow cone of fuel spray.

8. The method of claim 1, wherein the depth and elevational profile of the recess are selected to provide a substantially solid cone of fuel spray.

9. A method for regulating gas entrainment into a fuel spray of an internal combustion engine, the engine including a combustion chamber and a fuel injection nozzle disposed in fluid communication with the combustion chamber for direct injection of a combustible fuel, the method comprising the steps of:

providing a shrouding recess within a head region of the combustion chamber; and disposing the nozzle within the recess to inject a conical fuel spray generated from liquid fuel into the combustion chamber through the recess;

wherein the recess has a depth and elevational profile selected to limit gas entrainment from a volume including the combustion chamber into the fuel spray, whereby the fuel spray is at least partially shrouded from gas entrainment by the recess;

the elevational profile includes at least two different shrouding regions: a first region generally defines a right cylindrical section and a second region defines a diverging section.

10. The method of claim 9, wherein the second region is disposed proximate the combustion chamber with respect to the first region.

11. The method of claim 10, wherein the second region diverges in a direction toward the combustion chamber.

12. The method of claim 9, comprising the further step of providing a profiled peripheral region of the combustion chamber adjacent to the recess to regulate flow of gas towards the fuel spray during operation.

13. The method of claim 12, wherein the peripheral region has a generally dome-shaped profile.

14. The method of claim 9, wherein the depth and elevational profile of the recess are selected to provide a substantially hollow cone of fuel spray.

15. A method for regulating gas entrainment into a fuel spray of an internal combustion engine, the engine including a combustion chamber and a fuel injection nozzle disposed in fluid communication with the combustion chamber for direct injection of a combustible fuel, the method comprising the steps of:

disposing the nozzle in a spray shrouding recess in a head region of the combustion chamber, the recess having a depth and elevational profile selected to at least partially shroud a fuel spray injected by a nozzle from gas entrainment from a volume including the combustion chamber;

injecting a fuel spray via the nozzle and through the recess into the combustion chamber, and at least partially shrouding the fuel spray to limit entrainment of gas from the volume and thereby to maintain a desired profile and distribution of the fuel spray, wherein the recess includes a substantially right cylindrical section and a divergent section, the divergent section being contiguous with the right cylindrical section and diverging in a direction from the right cylindrical section towards the combustion chamber.

16. The method of claim 15, including the stop of providing a profile of a peripheral region of the combustion chamber adjacent to the recess to regulate flow of gas from the combustion chamber towards the fuel spray.

17. The method of claim 15, wherein the fuel spray is generated by directing a pressurized supply of liquid fuel to the nozzle.

18. The method of claim 17, wherein the fuel spray is injected by a pressure pulse generated in the liquid fuel.

19. The method of claim 15, wherein the fuel spray forms a generally hollow cone, and wherein the recess shrouds the fuel spray to maintain the cone substantially hollow at least to a location where the fuel spray exits the recess.

20. An internal combustion engine adapted to regulate gas entrainment into injected fuel spray, the engine comprising:

a combustion chamber having a head region and peripheral walls in which a piston is reciprocally movable;

a gas entrainment regulating recess formed in the head region and contiguous with the combustion chamber, the recess having a depth and elevational profile selected to limit entrainment of gas from the combustion chamber into a fuel spray injected into the combustion chamber; and a fuel injection nozzle disposed in the recess for injecting a fuel spray into the combustion chamber via the recess, wherein the recess includes a substantially right cylindrical section and a divergent section, the divergent section being continuous with the right cylindrical section and diverging in a direction from the right cylindrical section towards the combustion chamber.

21. The engine of claim 20, wherein a peripheral region of the combustion chamber adjacent to the recess has a profile selected to regulate flow of gas from the combustion chamber towards the fuel spray.

22. The engine of claim 20, wherein the fuel spray is generated by directing a pressurized supply of liquid fuel to the nozzle.

23. The engine of claim 22, wherein the fuel spray is injected by a pressure pulse generated in the liquid fuel.

24. The engine of claim 20, wherein the fuel spray forms a generally hollow cone, and wherein the recess shrouds the fuel spray to maintain the cone substantially hollow at least to a location where the fuel spray exits the recess.

* * * * *